July 8, 1958 L. F. GELBMAN 2,841,856
ELECTRIC CONCRETE MOLDING PROCESS
Filed April 28, 1955

INVENTOR
LAWRENCE F. GELBMAN
BY
ATTORNEY

2,841,856

ELECTRIC CONCRETE MOLDING PROCESS

Lawrence F. Gelbman, Yonkers, N. Y.

Application April 28, 1955, Serial No. 504,525

6 Claims. (Cl. 25—155)

This invention relates to an electric concrete molding process.

In the molding of concrete, whether into precast units for delivery to the job or into units that are cast in place on the job, it is important that the concrete be brought as quickly as possible to a self-supporting state, that is, to a degree of stiffness or to such measure of internal structural strength, as would enable it to maintain its molded shape when stripped from the mold or form. The cost of molded concrete, like the cost of other fabricated products, is predicated at least in part upon the time, and consequently, labor, required to advance it from unfinished to finished condition.

It is especially true of concrete molding that the quicker the molder concrete may be removed from the mold or the mold from the concrete, the less costly will be the process and the product be. Furthermore, as soon as a given mold is freed from one molding operation, it immediately becomes available for the next molding operation, and consequently the frequency with which a given mold may be used is a factor of the speed with which the molded concrete is able to acquire such degree or extent of internal stiffness and strength as will enable it to maintain its molded shape outside of the mold.

One process that has been tried in the strenuous efforts of concrete engineers to solve the problem of bringing molded concrete to a state of adequate stiffness and internal strength at the earliest possible moment involves passing an electric current through the molded concrete during the molding operation. One side of the mold is constituted as one electrode and the other side of the mold is constituted as the other electrode and electric current is passed from one electrode to the other through the entire mass of concrete in the mold. Where the molded concrete is only a few inches thick, this process of quickly stiffening and strengthening the concrete by passing an electric current therethrough is quite satisfactory.

The difficulty arises where the molded concrete exceeds several inches in thickness. For example, a concrete wall which is from 8 to 12 inches in thickness is exceedingly difficult or expensive to treat in accordance with the electric molding processes now in use. I have ascertained that the electric power which is consumed in properly treating molded concrete in a given period of time varies directly with the volume of concrete being treated. For example, treating a concrete wall 48 inches long, 12 inches high and 8 inches thick, in accordance with conventional electro-molding processes in order to strip the mold in five minutes requires thousands of kilowatts of electric power. The same result could readily be achieved with smaller power requirements but necessarily at the expense of the time element. In short, a given job can be done in relatively short time but with great expenditure of electrical energy or the same job can be accomplished with a more moderate expenditure of electrical energy but the time consumed would be excessive. In either case, however, the ultimate expenditure of energy is necessarily large since it is a factor of the quantity of concrete which is involved, and the sole important difference is in the voltage required to penetrate the concrete mass, greater voltage being required for quicker results and less voltage required for more leisurely results.

The principal object of this invention comprises an improvement in the electric molding process above described, rendering it possible to treat large masses of concrete with relatively small expenditure of electric power. In this invention, only the surface portions of the molded concrete are treated in the manner outlined in order to form a relatively stiff shell capable of supporting the entire concrete mass in molded shape outside of the mold.

In practicing the present invention, an optimum shell or wall thickness is selected, depending upon the electric power facilities available. For example, a 2-inch thickness may be deemed satisfactory in the molding of precast units which are 8 to 12 inches in thickness, these thickness figures being purely illustrative. Taking the 12-inch thick unit as an example, it will be observed that treating it to a depth of only 2 inches on each side leaves an untreated inner mass of approximately 8 inches in thickness. In no case, however, is the electric current passed through more than the 2-inch thickness of concrete above mentioned. This should be contrasted with the conventional electromolding processes which require the current to pass through the full 12 inch thickness of the entire unit.

When a 2-inch thick shell is stiffened and strengthened sufficiently to enable it not only to maintain its own molded shape but also to retain the untreated concrete mass within it, the entire unit may be removed from the mold despite the fact that the major part of it is unable to maintain itself in any given shape.

There are many important advantages which necessarily flow from the shell-type of electromolding process herein claimed. In the first place, there is a great saving in electric power. In the second place, many of the larger molding jobs which cannot now be treated in accordance with conventional electromolding procedure because of inadequate electric power facilities can now be treated in the manner herein claimed with excellent results. Furthermore, the present invention produces excellent results in all cases which present procedures are capable of treating, but with great saving of time, in addition to the saving of electrical energy. There is also the great advantage in the fact that adjustments in the apparatus are not required to compensate for different thicknesses of material since in all cases the apparatus would be set to pass electric current only through a shell of predetermined thickness, for example, 2 inches. Still another advantage resides in the fact that the mass of concrete within the treated shell retains much of its original water content which can be utilized in the curing that follows:

By way of illustration, a 110 volt current is perfectly adequate to treat a 2-inch thick shell of a 12-inch thick concrete unit in order to free it from its mold in only five minutes. It should be understood that the suggested thickness of 2 inches for the treated shell is purely illustrative and any other thickness may be treated, depending upon the molding and electric power facilities that happen to be available and individual preferences or needs, the thinner the shell that is capable of maintaining the molded shape of the entire concrete unit, the better. In many cases, a 1-inch thick shell would be fully adequate.

Still another important object of this invention is the provision of apparatus for carrying out the present process. This apparatus may be utilized to send an electric current through only the outer portions of a given mass of molded concrete in order to form a shell as described herein. The apparatus may also be utilized to form hollow concrete moldings or castings, such as a conventional concrete building block comprising a generally rectangular shell and a pair of internal transversely extending webs.

An important advantage of the apparatus herein claimed is its safety factor since all of its exposed parts are grounded and consequently may be touched by workmen without hazard. This safety feature is manifested in still another way since it will be recalled that only low voltage current is required in the practicing of this invention. The combination of a 110 volt current (instead of one many times that strong) with a fully grounded external apparatus (only the electrodes on the inside being live) provides great safety.

The invention is illustrated in the accompanying drawing in which.

Figure 1:
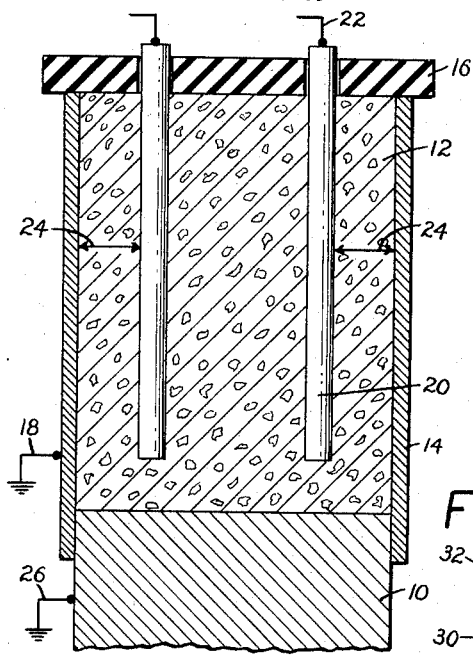
Fig. 1 is a vertical section through an electric molding apparatus made in accordance with this invention and functioning in accordance with this invention.
Figure 2:
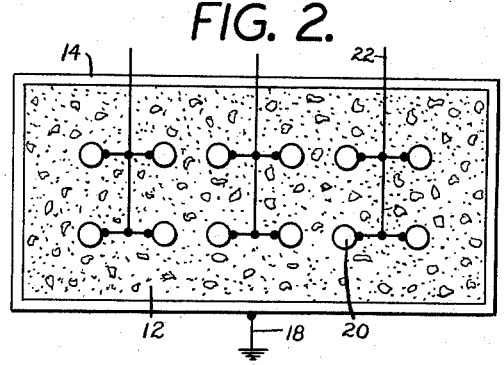
Fig. 2 is a top view thereof.

The apparatus shown in Figs. 1 and 2 is intended to represent the most elemental form of this invention. There is a base 10 which supports the concrete 12 and confining said concrete on said base is an enclosure 14. The base and said enclosure constitute the mold. It will be understood that the base and said enclosure may be movably mounted relative to each other to facilitate freeing the molded concrete therefrom. For example base 10 may be movable either downwardly or upwardly relative to enclosure 14. In the latter case, it would push the molded concrete upwardly out of the enclosure and in the former case the molded concrete would of its own weight follow the base and thereby slip out of said enclosure 14. The same results may be achieved by moving the enclosure relative to the base in either vertical direction or both the enclosure and the base may be moved relative to each other simultaneously and in opposite vertical directions.

At the top of enclosure 14 is a horizontal plate 16 which may be deemed to constitute the cover of the mold although molds of this general character are not necessarily provided with cover plates. However, should plate 16 be employed as the top wall of the mold, then it would be apparent that the mold herein shown comprises a bottom wall (base 10) and side walls (enclosure 14) and a top wall (plate 16).

It will be noted that enclosure 14 is made of electrically conductive material, such as sheet steel. It is grounded by means of electrical connecting means 18. Plate 16, on the other hand, is made, preferably, of electrically non-conductive material, such as hard rubber, plastics and even wood. Projecting through plate 16 are electrodes 20 which are connected by means of conductors 22 to a source of electric power, either alternating or direct current. Illustrative is a 110 volt alternating current or a 220 volt alternating current, either of which is generally available throughout the country.

The distance between these electrodes and the adjacent walls of enclosure 14 is indicated by arrows 24 and it will be understood that this distance may vary, depending upon individual preferences and requirements. By way of illustration, it will be assumed that arrows 24 represent a distance of 2 inches. When the circuit is closed between conductors 22 and the source of electric current, current will pass through electrodes 20 and from said electrodes to the adjacent walls of enclosure 14 through the concrete which is disposed between said electrodes and said adjacent walls of the enclosure.

Since electric current tends to follow the course of least resistance, it will not pass from these electrodes to the more distant walls of the enclosure and consequently no electric current will pass through the concrete which is disposed between the electrodes. The net result will be to stiffen the concrete in those marginal areas which lie between the electrodes on the one hand and the adjacent walls of enclosure 14 on the other hand. Some of the heat of this operation will undoubtedly penetrate the mass of concrete within said shell, that is, the concrete which is disposed between the electrodes themselves, and to that extent said inner mass will become somewhat stiffer, but not to the extent of the outer shell. Once the outer shell is stiff enough to maintain its own molded shape outside of the mold and to confine the inner mass of concrete, the entire concrete body may be removed from the mold and left to cure in conventional manner and by conventional means.

The number of electrodes which a given mold will take is determined mainly by the size of the mold. For example, Fig. 2 indicates that twelve electrodes may be employed in a single mold in two banks or rows of six electrodes each. Each bank of electrodes would be disposed at a distance of approximately 2 inches from the adjacent wall of the enclosure and the end electrodes of said banks of electrodes would also be disposed approximately 2 inches from the end walls of the enclosure. It will be observed that this will produce a substantially rectangular shell of stiffened concrete. In a smaller mold, fewer electrodes will be required and, indeed, if the mold is small enough, a single electrode will suffice. Larger molds, naturally, will require a greater number of electrodes.

It will be understood that base 10 may also be incorporated into the circuit, if desired. For example, base 10 may be made of electrically conductive material and grounded by means of electrical connection 26. In such case, current would also travel from the electrodes to the base and a shell of stiffened concrete having both sides and a bottom would thereby be formed.

It will also be understood that the particular shape of these electrodes, as shown in the drawing, is purely illustrative and any suitable form may be employed in connection with this invention. For example, a somewhat tapered shape may be found desirable since it would facilitate removal of the electrodes from the concrete at the conclusion of the stiffening operation herein described. The problem of removing the electrodes from the concrete is not a serious problem since the concrete is stiffened on only one side of the electrodes and it is still in a flowable state on the opposite side of the electrodes.

Another possibility involves the use of an electrically conductive plate 16 but insulated in conventional manner from the electrodes. Conventional insulating bushings would suffice for this purpose. In such case, it may be found desirable to provide a good electrical contact between said plate and enclosure 14 so as to bring the plate into the circuit. This would correspond to use of base 10 as an element in the circuit and in such case the shell would not only have sides and a bottom but it would also have a top, reference being here made to the shell of stiffened concrete.

Figure 5:
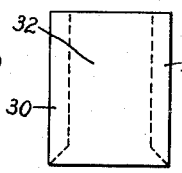
Fig. 5 is a diagrammatic view of a block of molded concrete stiffened marginally in accordance with the present invention in a mold in which the side walls only are conductive and grounded.
Figure 6:
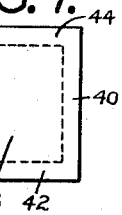
Fig. 6 is another diagrammatic view of a block of concrete stiffened marginally both at the sides and at the bottom in a mold whose side and bottom walls are conductive and grounded.
Figure 7:
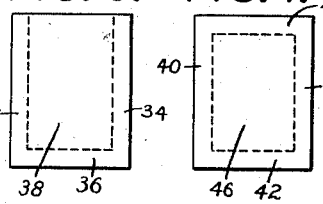
Fig. 7 is still another view of a block of concrete stiffened in accordance with the present invention on all sides and also at the top and bottom in a mold having sides, top and bottom which are conductive and grounded.

Figs. 5, 6 and 7 are intended to illustrate molded concrete stiffened marginally as herein described. Fig. 5 shows the result of a molding process as herein described, with only the side walls of the enclosure being conductive and grounded. A stiffened concrete shell having side walls 30 is formed in order to retain the inner mass of concrete 32 which is not sufficiently stiff to maintain its shape outside of the mold. This stiffened shell has no top and no bottom. Fig. 6 shows the result of electro-molding the concrete in a mold in which the base is also conductive and is grounded in order to form part of the circuit. A stiffened shell is thereby formed having side walls 34 and a bottom wall 36 but no top wall. The inner mass 38 lacks sufficient stiffness to maintain its shape outside of a mold but the shell 34, 36 serves as such mold and confines said inner mass. Fig. 7 shows the result of using a mold in which the side walls, bottom wall and top wall are all made of electrically conductive material and are all grounded as part of the same circuit. A shell of stiffened concrete having side walls 40, a bottom wall 42, and a top wall 44, is thereby formed to confine the inner mass of concrete 46 which lacks sufficient stiffness.

Figure 3:
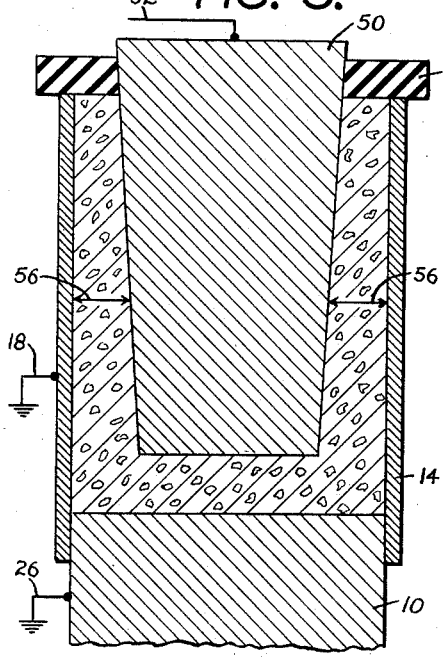
Fig. 3 is another vertical section through a modified form of apparatus made in accordance with this invention.
Figure 4:
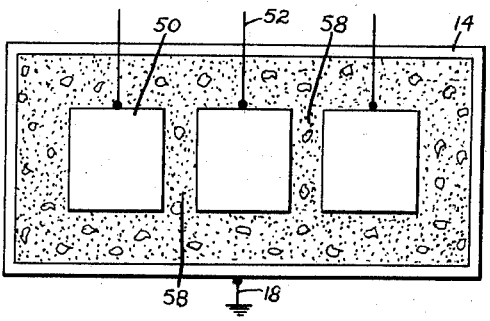
Fig. 4 is a top view thereof.

Turning now to Figs. 3 and 4, it will be observed that the same base 10 and enclosure 14 may be used in this modified form of apparatus and the only difference would be in the type of electrodes employed in connection therewith. Electrodes 50 themselves constitute molding forms or cores and the object is to provide a hollow molded or cast unit. Electrodes 50 comprise tapered blocks which are made of conductive material and they are connected by means of leads or conductors 52 to a suitable source of current. These electrodes, like the electrodes first above described, project through and are supported by a non-conductive horizontal plate. Plate 54 in Fig. 3 is made of hard rubber or plastic material or the like and it rests upon the side walls of enclosure 14. Arrows 56 between electrode 50 shown in Fig. 3 and the adjacent side walls of the enclosure are intended to represent a distance of approximately 2 inches to indicate the marginal portion or portions of the concrete mass through which the currrent is to pass. In this particular case, since there is no inner concrete mass corresponding to inner portions 32, 38 and 46, shown in Figs. 5, 6 and 7, the marginal portion or portions of the concrete constitute the main body of the concrete and the only portions through which the current does not pass are the two webs 58 which are disposed between the electrodes and the portion disposed below the electrodes.

The apparatus shown in Figs. 3 and 4 may also involve the use of a conductive base 10, as above described, grounded by means of electrical connection 26, as above described for the purpose of passing electric current between the bottom ends of the electrodes and said base 10, in which case a complete shell of stiffened concrete, having side walls and a bottom wall would be formed and only the inner webs of concrete would lack sufficient stiffness to maintain themselves outside of the mold. However, the fact that these webs do receive some of the heat and the fact that they are joined to the stiffened side walls of the concrete molding, are sufficient to support them outside of the mold.

Figure 8:
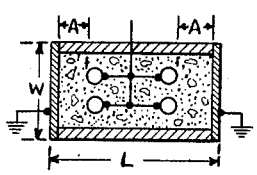
Fig. 8 is a top view of a mold as used in certain tests hereinafter described, the dimensions of said mold varying in the various tests.

The following data gives the results of various tests relating to the present invention, giving voltage and amperage readings with approximate stripping time. These tests were conducted with molds corresponding to the molds shown in Fig. 8 wherein the two sides L are made of electrically non-conductive material, such as wood or plastics and the two sides W are made of electrically conductive material, such as steel. L also represents length and W represents width. It will be observed that steel sides W are grounded. There are four electrodes E in the mold and they are electrically connected. Fig. 8 is not drawn to scale and it simply represents the general type of mold which was used in these tests. In the main, the electrodes were quarter inch rods and the other dimensions will hereinafter be given in connection with the several tests. In all cases the mold height was six inches.

TEST SERIES 1

Test 1A

L now represents 6 inches and W 4 inches and the distance A is 1½ inches, the distance B 2 inches. The electrodes are connected to one phase of a 220 volt, 3-phase line. Sides W are, of course, grounded and there is a 110 volt potential between said sides W and the electrodes E.

Electric readings: Amps.
Peak current (1 minute, 15 seconds)_____ 32
Off in 4 minutes_____ 13

Transpose to a larger mold wherein W becomes 48 inches and L from 4 inches to 12 inches, dimension A remaining 1½ inches, single phase, 110 volts.

Peak current, amperage equals 700 amps.—77 kva.
3-phase, 220 volts (connected as shown in drawing) to ground mold (110 volt potential)
Peak amperage per phase, 233 amps.—51 kva.

Test 1B

Same mold as in first test, W equals 4 inches and L equals 6 inches, distance A equals ¾ inch. Voltage applied equals 45 volts.

Electric readings: Amps.
Peak current (2 minutes)_____ 22.5
Off—5 minutes _____ 18.75

Transposed to larger mold wherein W is 48 inches and L is from 4 inches to 12 inches, A being ¾ of an inch.

Single phase, 45 volts, 540 amps.—24.3 kva.
3 phase, 90 volts (transformer step down)
Peak amperage per phase, 180 amps.—15.2 kva. (total)

Test 1C

Same mold as in first test wherein W equals 4 inches and L equals 6 inches and dimension A equals 2 inches.

Peak current (same electric potentials as first test) 1 minute, 30 seconds—27 amps.
Off at 5 minutes—3 amps.

Transposed to larger mold wherein L equals 48 inches and W is from 4 inches to 12 inches.

Single phase 180 volts, peak 585 amps.—64.3 kva.
3-phase (110 volt potential) peak amperage per phase, 195 amps.—42.9 kva.

TEST SERIES 2

Test 2A

Used mold wherein W equals 4 inches and L equals 6 inches, electrodes set up as in test 1C. Electricity applied was 1-phase of 3-phase, 220 volt line, mold grounded.

Current reading at peak (1 minute, 30 seconds)—48 amps.

This substantiates transpositions in test series 1.

Although test 1B shows smallest power consumption, a tranformer is required. This may or may not be more economical in the long run. But by proper spacing of the electrodes (which is possible under this system) a balance to give the most economical performance is possible.

Other tests have been conducted but the foregoing are typical.

On the low voltage series of tests (not specifically included in the foregoing data) 30 v. with 3 inch travel through the concrete was the minimum permissible to avoid distortion in an open mold. This varies with thickness but in any case, if a voltage low enough to prevent distortion in an open mold is used, stripping before approximately one hour is impossible.

The foregoing is illustrative of preferred forms of this invention and it will be understood that these preferred forms may be modified and other forms may be provided within the broad spirit of the invention and the broad scope of the claims.

I claim:

1. An electric molding process for making concrete blocks and other forms by molding them and stiffening only their external parts and thereby providing said external parts with sufficient structural strength to contain their inner unstiffened parts and then letting the concrete set without any external means of maintaining its molded form, comprising the steps of depositing the concrete in a mold, passing an electric current through marginal portions of the concrete to form a shell of stiffened concrete surrounding a core of relatively unstiffened concrete, and then removing the concrete from the mold without waiting for the inner core of concrete to stiffen.

2. An electric molding process for making concrete blocks and other forms by molding them and stiffening only their external parts and thereby providing said external parts with sufficient structural strength to contain their inner unstiffened parts and then letting the concrete set without any external means of maintaining its molded form, comprising the steps of depositing in a mold concrete which lacks sufficient stiffness to maintain its molded shape outside of the mold, passing an electric current through marginal portions only of the concrete in order to stiffen said marginal portions sufficiently to maintain their molded shape outside of the mold, leaving the inner portions of the concrete lacking in sufficient stiffness to maintain themselves in molded shape outside of the mold, and then removing the molded concrete from the mold when the marginal portions of said concrete are sufficiently stiff to confine the inner portions of unstiffened concrete.

3. An electric molding process for making concrete blocks and other forms by molding them and stiffening only their external parts and thereby providing said external parts with sufficient structural strength to contain their inner unstiffened parts and then letting the concrete set without any external means of maintaining its molded form, comprising the steps of depositing soft concrete in a mold, passing an electric current through outer portions of said soft concrete to stiffen said outer portions sufficiently to form a shell capable of supporting itself outside of the mold and capable of confining the inner portions of said concrete, and then removing said concrete from said mold.

4. An electric molding process in accordance with claim 3, wherein the outer portions of the soft concrete through which the electric current is passed are all of the outer side portions of said concrete to a depth of approximately two inches.

5. An electric molding process in accordance with claim 3, wherein the outer portions of the soft concrete through which the electric current is passed are all of the outer side portions of said concrete and the outer bottom portion thereof, all to a depth of approximately two inches.

6. An electric molding process in accordance with claim 3, wherein the outer portions of the soft concrete through which the electric current is passed are all of the outer side portions of said concrete and the outer bottom and top portions thereof, all to a depth of approximately two inches.

References Cited in the file of this patent

UNITED STATES PATENTS

| | | |
|---|---|---|
| 1,735,909 | Rosenqvist | Nov. 19, 1929 |
| 1,808,762 | Brund et al. | June 9, 1931 |
| 2,152,365 | Smith | Mar. 28, 1939 |
| 2,500,866 | Ramsay | Mar. 14, 1950 |
| 2,683,916 | Kelly | July 20, 1954 |

FOREIGN PATENTS

| | | |
|---|---|---|
| 672,137 | Great Britain | May 14, 1952 |